United States Patent
Yi

(10) Patent No.: US 12,413,162 B2
(45) Date of Patent: Sep. 9, 2025

(54) ELECTRONIC DEVICE WITH IMPROVED DRIVING MECHANISM STRUCTURE

(71) Applicant: VIVO MOBILE COMMUNICATION CO., LTD., Guangdong (CN)

(72) Inventor: Xiaojun Yi, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 750 days.

(21) Appl. No.: 17/727,349

(22) Filed: Apr. 22, 2022

(65) Prior Publication Data

US 2022/0247330 A1  Aug. 4, 2022

Related U.S. Application Data

(63) Continuation of application No. PCT/CN2020/121916, filed on Oct. 19, 2020.

(30) Foreign Application Priority Data

Oct. 23, 2019 (CN) .......................... 201911013990.1

(51) Int. Cl.
*H02N 2/16* (2006.01)
*H02N 2/00* (2006.01)
(Continued)

(52) U.S. Cl.
CPC .............. *H02N 2/163* (2013.01); *H02N 2/006* (2013.01); *H02N 2/0095* (2013.01); *H02N 2/10* (2013.01); *H04M 1/026* (2013.01)

(58) Field of Classification Search
CPC ........ H02N 2/163; H02N 2/0095; H02N 2/16; H02N 2/10; H02N 11/006; H04M 1/026
See application file for complete search history.

(56) References Cited

U.S. PATENT DOCUMENTS 5,726,519 A * 3/1998 Gonnard ................ H02N 2/163
310/323.04
2010/0207488 A1  8/2010  Ting et al.
(Continued)

FOREIGN PATENT DOCUMENTS

CN    101174422 A    5/2008
CN    102053336 A    5/2011
(Continued)

OTHER PUBLICATIONS

1st Chinese Office Action, English Translation.
(Continued)

*Primary Examiner* — Emily P Pham
(74) *Attorney, Agent, or Firm* — BROOKS KUSHMAN P.C.

(57) ABSTRACT

An electronic device is provided, including a shell, a driving mechanism and a driven module, wherein the shell is provided with an avoidance space communicating with an inner cavity of the shell; the driving mechanism includes at least two first field deformation structural components; the first field deformation structural components are arranged in the avoidance space; the adjacent two first field deformation structural components are distributed at intervals and energizing currents are opposite; the driven module is connected to the first field deformation structural components; and when the first field deformation structural components are in a power-up state, each of the first field deformation structural components drives the driven module to rotate through deformation.

11 Claims, 3 Drawing Sheets

(51) Int. Cl.
*H02N 2/10* (2006.01)
*H04M 1/02* (2006.01)

(56) References Cited

U.S. PATENT DOCUMENTS

| | | | |
|---|---|---|---|
| 2015/0053884 A1 | 2/2015 | Matsuda et al. | |
| 2019/0094566 A1 | 3/2019 | Kimura | |

FOREIGN PATENT DOCUMENTS

| | | | |
|---|---|---|---|
| CN | 203708344 | U | 7/2014 |
| CN | 104850188 | A | 8/2015 |
| CN | 107755365 | A | 3/2018 |
| CN | 208386641 | U | 1/2019 |
| CN | 208401984 | U | 1/2019 |
| CN | 110677072 | A | 1/2020 |
| EP | 0347846 | A2 | 12/1989 |
| EP | 0347846 | A3 | 12/1989 |
| EP | 0360975 | A2 | 4/1990 |
| EP | 0360975 | A3 | 4/1990 |
| JP | S63257474 | A | 10/1988 |
| JP | 2013216565 | A | 10/2013 |
| KR | 20010102658 | A | 11/2001 |

OTHER PUBLICATIONS

Chinese Search Report, English Translation.
International Search Report and Written Opinion, English Translation.
Extended European Search Report for Application No. 20879955.1-1212, dated Jun. 2, 2023, 7 Pages.
First Office Action for Japanese Application No. 2022-522670, dated Apr. 20, 2023, 3 Pages.
First Office Action for Chinese Application No. 201911013990.1, dated Jun. 3, 2020, 9 Pages.
International Search Report and Written Opinion for Application No. PCT/CN2020/121916, dated Jan. 12, 2021, 9 Pages.
Search Report for Chinese Application No. 201911013990.1, dated Apr. 7, 2020, 5 Pages.

\* cited by examiner

ELECTRONIC DEVICE WITH IMPROVED DRIVING MECHANISM STRUCTURE

CROSS-REFERENCE TO RELATED APPLICATIONS

This application is a continuation application of International Application No. PCT/CN2020/121916 filed on Oct. 19, 2020, which claims priority to Chinese Patent Application No. 201911013990.1 filed on Oct. 23, 2019, which are incorporated herein by reference in their entireties.

TECHNICAL FIELD

The present disclosure relates to the technical field of communication, and in particular, to an electronic device.

BACKGROUND

With the progress of technologies and the development of electronic devices, users' demands for full-screen electronic devices are gradually increasing. With the development of the full-screen electronic devices, some driven modules are arranged in the electronic device; meanwhile, in order to make the driven modules realize corresponding functions, the electronic device further includes a driving mechanism, and the driving mechanism is used to drive the driven modules to realize corresponding functions.

Usually, the driving mechanism mainly includes a driving motor and a transmission device. However, since the driving motor and the transmission device have relatively complex structures, the volume is relatively large, so that the internal spatial arrangement of the electronic device is affected; meanwhile, the driving device is generally a metal material, so that the overall weight of the driving mechanism is relatively large, and a certain noise will be generated when the driving motor works, thereby affecting user experience.

SUMMARY

The present disclosure provides an electronic device.

An electronic device includes a shell, a driving mechanism and a driven module, wherein the shell is provided with an avoidance space communicating with an inner cavity of the shell; the driving mechanism includes at least two first field deformation structural components; the first field deformation structural components are arranged in the avoidance space; the adjacent two first field deformation structural components are distributed at intervals and energizing currents are opposite; the driven module is connected to the first field deformation structural components; and when the first field deformation structural components are in a power-up state, each of the first field deformation structural components drives the driven module to rotate through deformation.

The technical solutions used in the present disclosure can achieve the following beneficial effects:

The electronic device disclosed by the embodiments of the present disclosure utilizes vibration of a plurality of first field deformation structural components to form traveling wave propagated along the rotating direction of the driven module, so as to drive the driven module to rotate. Compared with existing driving mechanisms, in the embodiments disclosed by the present disclosure, the driving mechanism does not require a driving motor and a transmission device, so that the structure of the driving mechanism is relatively simple, the internal space of the electronic device occupied by the driving mechanism is relatively small, and the generated noise is relatively low.

BRIEF DESCRIPTION OF DRAWINGS

The accompanying drawings described herein are used to provide further understanding of the present disclosure and constitute a part of the present disclosure. The illustrative embodiments of the present disclosure and descriptions thereof are used to explain the present disclosure, and do not constitute an improper limitation to the present disclosure. In the accompanying drawings.

DESCRIPTION OF REFERENCE NUMERALS

100—Driven module;
200—First field deformation structural component;
300—First elastic portion;
400—Second field deformation structural component;
500—Middle frame, 510—First groove;
600—Rear cover, 610—Second groove;
700—Circuit layer;
800—Insulating layer.

DETAILED DESCRIPTION

To make the objectives, technical solutions, and advantages of the present disclosure clearer, the following clearly describes the technical solutions of the present disclosure with reference to specific embodiments of the present disclosure and the accompanying drawings. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The following describes in detail the technical solutions disclosed in the embodiments of the present disclosure with reference to the accompanying drawings.

Figure 1:
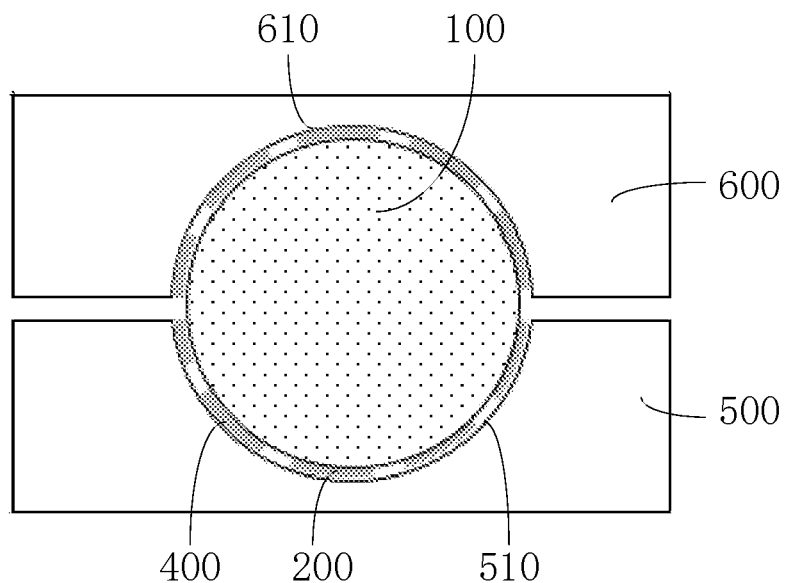
FIG. 1 is a structural schematic diagram of an electronic device according to an embodiment of the present disclosure.
Figure 2:
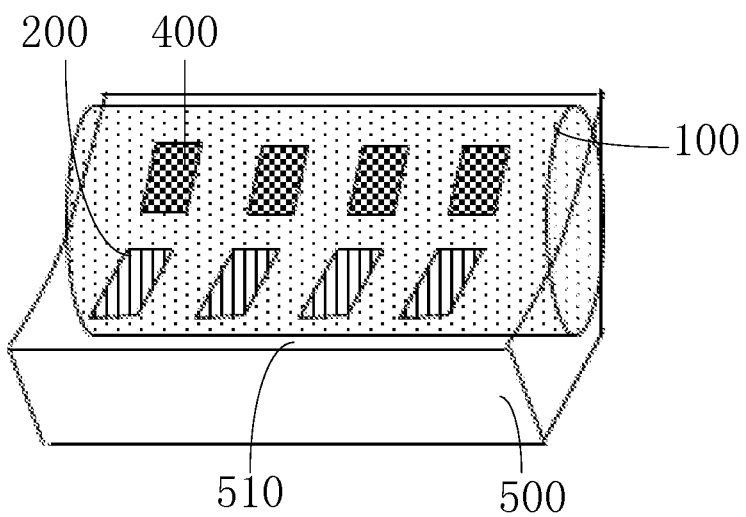
FIG. 2 is a schematic diagram of a partial structure of a driven module of an electronic device according to an embodiment of the present disclosure in a retracted state.
Figure 3:
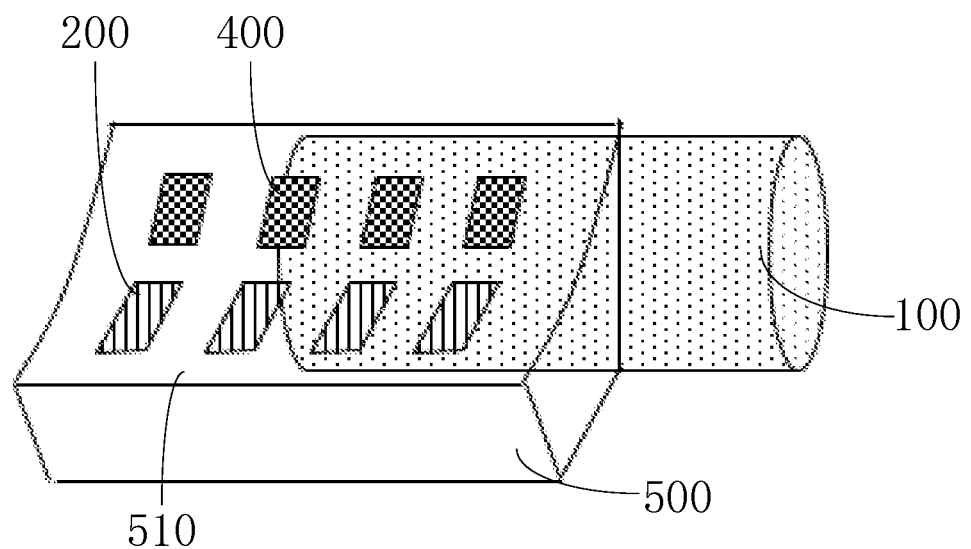
FIG. 3 is a schematic diagram of a partial structure of a driven module of an electronic device according to an embodiment of the present disclosure in a stretched state.
Figure 4:
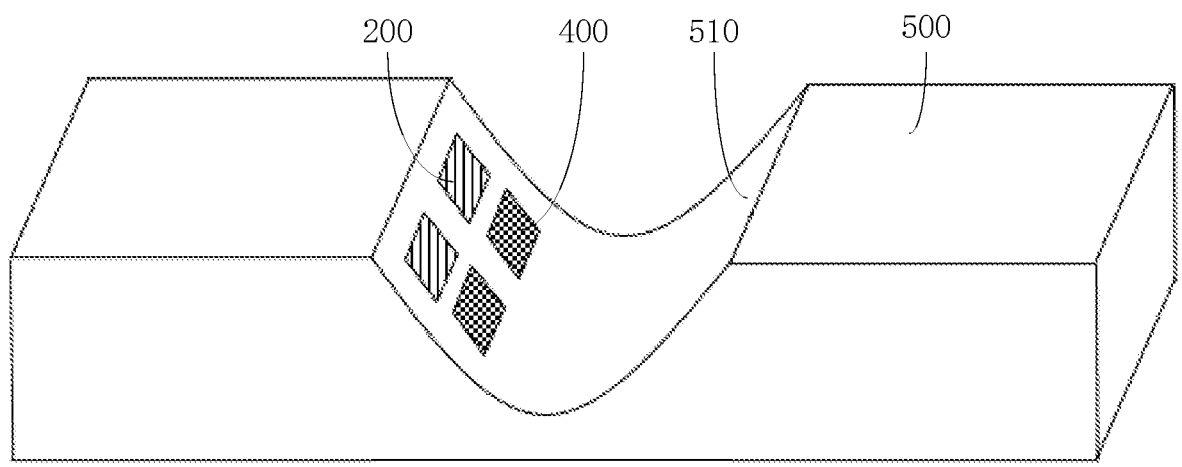
FIG. 4 and FIG. 5 are schematic diagrams of partial structures of an electronic device according to an embodiment of the present disclosure.
Figure 5:
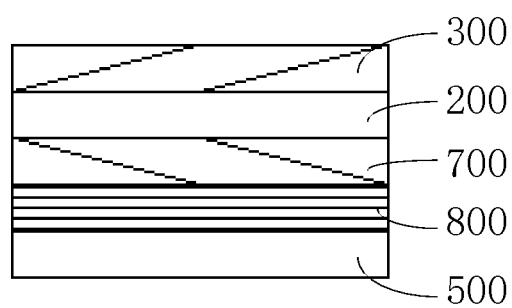

As shown in FIG. 1 to FIG. 5, the present disclosure discloses an electronic device. The disclosed electronic device includes a shell, a driving mechanism and a driven module 100.

The shell is a peripheral component of the electronic device. The shell can provide a mounting position for other components of the electronic device. In the embodiments of the present disclosure, the shell is provided with an avoidance space communicating with an inner cavity of the shell.

The driving mechanism is connected to the driven module 100. The driving mechanism can drive the driven module 100 to move. Specifically, the driving mechanism includes at least two first field deformation structural components 200; the first field deformation structural components 200 are arranged in the avoidance space; the adjacent two first field deformation structural components 200 are distributed at intervals and energizing currents are opposite; the driven module 100 is connected to the first field deformation structural components 200; and the first field deformation structural components 200 can drive the driven module 100 to move through deformation.

The driven module 100 may include at least one of a camera assembly, a light supplementing module, a fingerprint identification module, a USB interface and a receiver. The embodiments of the present disclosure do not limit the specific types of the driven module 100.

In the specific working process, the first field deformation structural components 200 are in a power-up state, each of the first field deformation structural components 200 is subjected to telescopic deformation, and any adjacent two first field deformation structural components 200 are subjected to alternatively telescopic deformation, so that the at least two first field deformation structural components 200 are arranged to form traveling wave propagated along the rotating direction of the driven module 100, and the driven module 100 is driven to rotate. In this case, the driven module 100 may rotate to any direction, thereby avoiding the requirements of arranging a plurality of driven modules 100 to realize the work of the driven modules 100 in multiple directions. In the embodiments of the present disclosure, the process and the principle of forming traveling wave through telescopic deformation after at least two first field deformation structural components 200 are energized are well-known technologies, and will not be elaborated herein.

Of course, the shell and the display screen of the electronic device may be provided with light-transmitting areas, and the driven module 100 may work through the light-transmitting areas.

It can be known from the above working process that the electronic device disclosed by the embodiments of the present disclosure utilizes vibration of a plurality of first field deformation structural components 200 to form traveling wave propagated along the rotating direction of the driven module 100, so as to drive the driven module 100 to rotate. Compared with existing driving mechanisms, in the embodiments of the present disclosure, the driving mechanism does not require a driving motor and a transmission device, so that the structure of the driving mechanism is relatively simple, the internal space of the electronic device occupied by the driving mechanism is relatively small, and the generated noise is relatively low.

In the electronic device disclosed by the embodiments of the present disclosure, in order to improve the driving effect of the first field deformation structural components 200 on the driven module 100, the driving module may further include a first elastic portion 300. Specifically, the first elastic portion 300 is arranged between the driven module 100 and the first field deformation structural components 200. The first elastic portion 300 may deform along with the deformation of the first field deformation structural components 200, and the first elastic portion 300 can enlarge the traveling wave formed by the first field deformation structural components 200, so that the driving effect of the first field deformation structural components 200 on the driven module 100 is more obvious.

Of course, in order to prevent the work of the driven module 100 from being affected by the shell, in the specific working process, at least part of the driven module 100 may stretch out of the shell for work through the avoidance space. At the same time, after the work is completed, the driven module 100 can retract in the shell through the avoidance space. Therefore, in order to make the driven module 100 retract in the shell or at least partially stretch out of the shell, the driving mechanism may further include at least two second field deformation structural components 400. Similarly, the second field deformation structural components 400 may also be arranged in the avoidance space; and the adjacent two second field deformation structural components 400 are distributed at intervals and energizing currents are opposite.

In the specific working process, the second field deformation structural components 400 are in a power-up state, each of the second field deformation structural components 400 is subjected to telescopic deformation, and any adjacent two second field deformation structural components 400 are subjected to alternatively telescopic deformation, so that the at least two second field deformation structural components 400 are arranged to form traveling wave propagated along the telescoping direction of the driven module 100, and the driven module 100 can be driven to retract the shell through the avoidance space or at least partially stretch out of the shell. Of course, in order to realize the movement of the driven module 100 in two directions, it is only necessary to change the direction of the energizing current of the second field deformation structural components 400.

Of course, in this case, the first field deformation structural components 200 and the second field deformation structural components 400 may cooperate mutually so as to drive the driven module 100 to move. Specifically, the first field deformation structural components 200 may be controlled firstly to drive the driven module 100 to rotate to a specified direction, and then the second field deformation structural components 400 may be controlled to drive the driven module 100 to stretch out of the shell for work. Of course, the second field deformation structural components 400 may be controlled firstly to drive the driven module 100 to stretch out of the shell. Further, the first field deformation structural components 200 are controlled to drive the driven module 100 to rotate to a specified direction for work.

In an optional solution, the first field deformation structural components 200 and the second field deformation structural components 400 may be controlled at the same time. Specifically, in the process that the first field deformation structural components 200 drive the driven module 100 to rotate, the second field deformation structural components 400 drive the driven module 100 to stretch out of the shell, so that the two driving effects of the driving mechanism on the driven module 100 are performed simultaneously, and finally the working efficiency of the driving mechanism is improved.

The first field deformation structural components 200 and the second field deformation structural components 400 may be arranged in the avoidance space in various manners. For example, the first field deformation structural components 200 and the second field deformation structural components 400 may be distributed at intervals in the telescoping direction of the driven module 100, or the first field deformation structural components 200 and the second field deformation structural components 400 may also be distributed at intervals in the rotating direction of the driven module 100. Of course, in an optional solution, the first field deformation structural components 200 and the second field deformation structural components 400 may be distributed at intervals in the rotating direction of the driven module 100. Compared with other arrangement manners, this manner is more favorable for the mounting of the first field deformation structural components 200 and the second field deformation structural components 400.

Meanwhile, in this case, the first field deformation structural components 200 may be arranged in rows in the avoidance space. Similarly, the second field deformation structural components 400 may also be arranged in rows in the avoidance space. Of course, in an optional solution, the first field deformation structural components 200 and the second field deformation structural components 400 may be arranged in a crossed manner in the avoidance space. In this manner, one row of second field deformation structural components 400 may be arranged at intervals between any two rows of first field deformation structural components 200, and each row of first field deformation structural components 200 and each row of second field deformation structural components 400 are arranged along the telescoping direction of the driven module 100. This distribution manner can fulfill the aim of balancing driving.

Of course, the driving mechanism may further include a second elastic portion. Specifically, the second elastic portion is arranged between the driven module 100 and the second field deformation structural components 400. The second elastic portion can enlarge the traveling wave formed by the second field deformation structural components 400, so that the driving effect of the second field deformation structural components 400 on the driving module 100 is more obvious.

In the embodiments disclosed by the present disclosure, the avoidance space may be formed on the middle frame 500 of the shell, or may also be formed at other positions of the shell. Generally, in order to make the appearance performance of the electronic device better, the avoidance space may be formed on the middle frame 500 of the shell. Specifically, the avoidance space may be an avoidance hole. Of course, in order to facilitate the mounting of the first field deformation structural components 200, the avoidance space may be a groove, and the first field deformation structural components 200 may be paved on an inner wall of the groove.

In order to make the rear cover 600 of the shell not affect the movement of the driven module 100, in the embodiments of the present disclosure, the middle frame 500 may be provided with a first groove 510, the rear cover 600 may be provided with a second groove 610, and the first groove 510 and the second groove 610 form an avoidance space. In this case, the compact structure of the electronic device can be ensured, and the mounting of the first field deformation structural components 200 can be facilitated.

Of course, the first field deformation structural components 200 may also be arranged on an inner wall of the second groove 610, so that the first field deformation structural components 200 can drive the driven module 100 to move at a plurality of positions of the driven module 100, so that the driving effect of the first field deformation structural components 200 on the driven module 100 is improved. Meanwhile, in order to improve the movement stability of the driven module 100, the first field deformation structural component 200 on the first groove 510 and the first field deformation structural component 200 on the second groove 610 may be arranged oppositely, so that the driven module 100 is subjected to a balanced driving force at each position, and the driven module 100 can move stably.

Generally, in order to facilitate electrical connection of the first field deformation structural components 200, the electronic device may further include a circuit layer 700, wherein the circuit layer 700 may be arranged in the avoidance space, the first field deformation structural components 200 may be arranged on the circuit layer 700 and are electrically connected to the circuit layer 700, so that the energizing current of each of the first field deformation structural components 200 can be controlled conveniently.

Of course, the middle frame 500 is generally a metal piece, so in order to prevent the short circuit of the middle frame 500 and the circuit layer 700, the electronic device may further include an insulating layer 800. In the specific assembling process, the insulating layer 800 may be paved on the avoidance space, and the circuit layer 700 may be paved on the insulating layer 800, so that the middle frame 500 is separated from the circuit layer 700 through the insulating layer 800, and the short circuit of the middle frame 500 and the circuit layer 700 is avoided. Meanwhile, in order to ensure the connection reliability of each layer, each layer may be stacked together in an adhesion manner.

In the electronic device disclosed by the embodiments of the present disclosure, the first field deformation structural components 200 and the second field deformation structural components 400 may realize driving functions in various manners, for example, the first field deformation structural components 200 and the second field deformation structural components 400 may all be electrostrictive pieces. The electrostrictive pieces are formed by electrostrictive materials, and the electrostrictive materials may be one of a piezoelectric single crystal, a piezoelectric polycrystal, a piezoelectric polymer or a piezoelectric composite material.

The specific working manners of the electrostrictive pieces are: when an electric field is applied to the surface of the piezoelectric material, an electric dipole moment will be lengthened due to the action of the electric field, and the piezoelectric material will stretch along the direction of the electric field to resist the change, so that the aim of driving the driven module 100 is fulfilled. Of course, the electrostrictive pieces may be made of various materials. In an optical solution, the electrostrictive pieces may be shape memory alloy pieces. Compared with the electrostrictive pieces made of other materials, the shape memory alloy has longer service life.

Of course, the first field deformation structural components 200 and the second field deformation structural components 400 each may include electromagnetic coils and magnetostrictive pieces, wherein the electromagnetic coils and the magnetostrictive pieces are arranged in the avoidance space, the magnetostrictive pieces are connected to the driven module 100, the electromagnetic coils can generate a magnetic field during energization, and the magnetostrictive pieces can deform in the magnetization direction after being magnetized in the magnetic field. Specifically, the magnetostrictive pieces may be one of an alloy telescoping material, a piezoelectric ceramic material or a rare earth intermetallic compound magnetostrictive material. In the specific working process, when the electromagnetic coils are in a power-up state, the magnetostrictive pieces are magnetized through the magnetic field at the periphery of the electromagnetic coils, so that the magnetostrictive pieces deform, and the driven module 100 is finally driven to move.

The first field deformation structural components 200 and the second field deformation structural components 400 may all photostrictive pieces, the materials of the photostrictive pieces are photostrictive materials, and the photostrictive materials can deform under the irradiation of light beams, so that the photostrictive pieces can drive the driven module 100 to move through deformation. Of course, the photostrictive materials may be a ferroelectric material, photosensitive perovskite and the like.

The electronic device disclosed in the embodiments of the present disclosure may be a smart phone, a tablet computer, an e-book reader, a wearable device and the like. Of course, the electronic device may also be other devices, and the embodiments of the present disclosure do not limit the specific types of the electronic device.

The foregoing embodiments of the present disclosure focus on describing differences between the embodiments, and different optimization features of the embodiments may be combined to form better embodiments provided that they are not contradictory. Considering brevity, details are not described herein again.

The foregoing descriptions are merely embodiments of the present disclosure, but are not intended to limit the present disclosure. For a person skilled in the art, various modifications and changes may be made to the present disclosure. Any modification, equivalent replacement, or improvement made without departing from the spirit and principle of the present disclosure shall fall within the scope of the claims of the present disclosure.

The invention claimed is:

1. An electronic device, comprising a shell, a driving mechanism and a driven module, wherein the shell is provided with an avoidance space communicating with an inner cavity of the shell; the driving mechanism comprises at least two first field deformation structural components; the at least two first field deformation structural components are arranged in the avoidance space; wherein every two adjacent first field deformation structural components among the at least two first field deformation structural components are distributed at intervals and have opposite energizing currents; the driven module is connected to the at least two first field deformation structural components; and when the at least two first field deformation structural components are in a power-up state, each of the at least two first field deformation structural components drives the driven module to rotate through deformation.

2. The electronic device according to claim 1, wherein the first driving mechanism further comprises a first elastic portion, and the first elastic position is arranged between the driven module and the at least two first field deformation structural components.

3. The electronic device according to claim 1, wherein the driving mechanism further comprises at least two second field deformation structural components; the at least two second field deformation structural components are arranged in the avoidance space; wherein every two adjacent second field deformation structural components among the at least two second field deformation structural components are distributed at intervals and have opposite energizing currents; and when the at least two second field deformation structural components are in a power-up state, each of the at least two second field deformation structural components drives the driven module through deformation to retract in the shell through the avoidance space or at least partially stretch out of the shell.

4. The electronic device according to claim 3, wherein the at least two first field deformation structural components and the at least two second field deformation structural components are distributed at intervals in a rotating direction of the driven module.

5. The electronic device according to claim 3, wherein the driving mechanism further comprises a second elastic portion, and the second elastic portion is arranged between the driven module and the at least two second field deformation structural components.

6. The electronic device according to claim 1, wherein the shell comprises a middle frame and a rear cover, the middle frame is connected to the rear cover, the middle frame is provided with a first groove, the rear cover is provided with a second groove, the first groove and the second groove form the avoidance space, and at least one of the at least two first field deformation structural components is arranged on an inner wall of the first groove.

7. The electronic device according to claim 6, wherein at least another one of the at least two first field deformation structural components is arranged on an inner wall of the second groove; and the at least one of the at least two first field deformation structural components on the first groove and the at least another one of the at least two first field deformation structural components on the second groove are arranged opposite to each other.

8. The electronic device according to claim 6, further comprising a circuit layer and an insulating layer, wherein the insulating layer is paved on the avoidance space, the circuit layer is paved on the insulating layer, the at least two first field deformation structural components are arranged on the circuit layer and are electrically connected to the circuit layer.

9. The electronic device according to claim 3, wherein the at least two first field deformation structural components and the at least two second field deformation structural components are electrostrictive pieces.

10. The electronic device according to claim 3, wherein the at least two first field deformation structural components and the at least two second field deformation structural components are photostrictive pieces.

11. The electronic device according to claim 3, wherein the at least two first field deformation structural components and the at least two second field deformation structural components each comprises electromagnetic coils and magnetostrictive pieces; the electromagnetic coils and the magnetostrictive pieces are arranged in the avoidance space; the magnetostrictive pieces are connected to the driven module; and when the electromagnetic coils are in a power-up state, the magnetostrictive pieces deform to drive the driven module to rotate.

* * * * *